Oct. 23, 1923.
D. B. CROCKETT
1,471,386
DEVICE FOR STOPPING LEAKS IN PIPES
Filed May 7, 1921
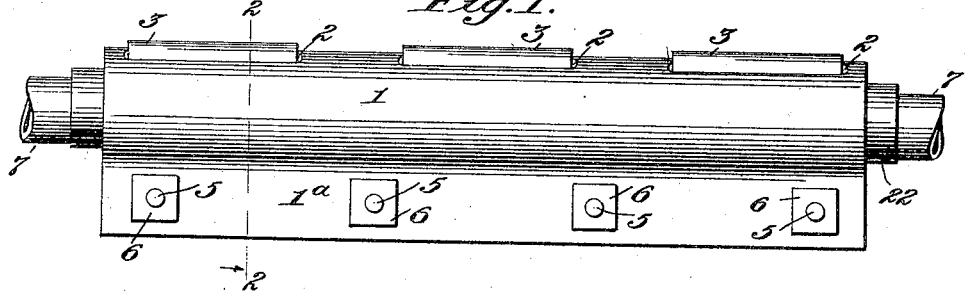
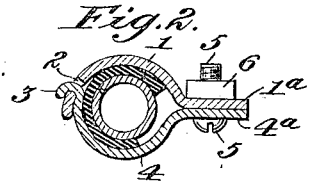 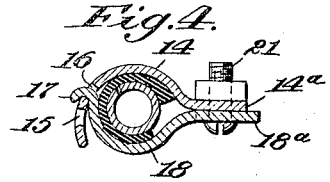
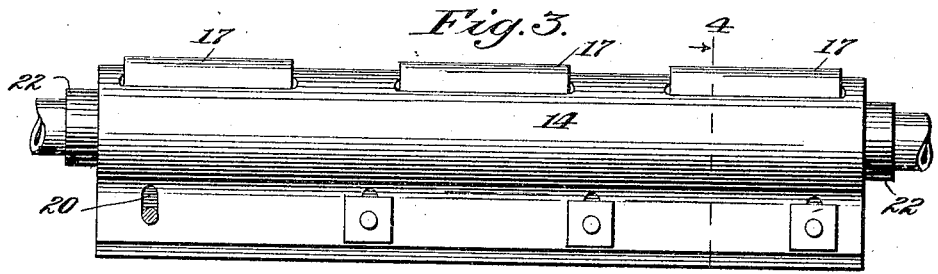
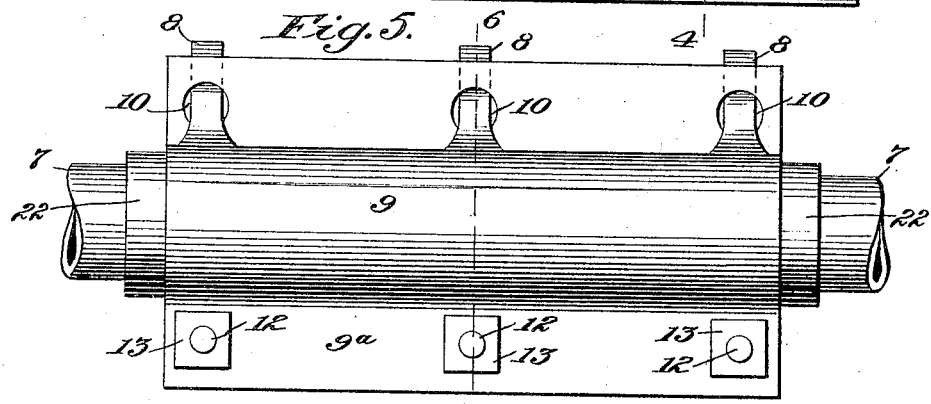
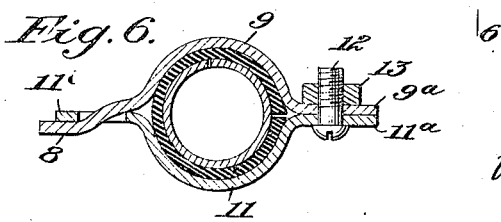
Inventor:
David B. Crockett,
by Cushman Bryant & Darby
Attys.

Patented Oct. 23, 1923.

1,471,386

UNITED STATES PATENT OFFICE.

DAVID BERNARD CROCKETT, OF CHARLESTON, WEST VIRGINIA.

DEVICE FOR STOPPING LEAKS IN PIPES.

Application filed May 7, 1921. Serial No. 467,766.

*To all whom it may concern:*

Be it known that I, DAVID BERNARD CROCKETT, a citizen of the United States, residing at Charleston, in the county of Kanawha and State of West Virginia, have invented new and useful Improvements in Devices for Stopping Leaks in Pipes, of which the following is a specification.

The present invention relates to an improved means for stopping leaks in pipes and the particular object of the invention is to provide a very simple and inexpensive means which may be readily applied by anyone to effectually close a crack or break in a pipe, such as is produced, for example, by freezing of water in the pipe.

The present invention provides a means by which such a break may be readily repaired without requiring the services of a skilled plumber or mechanic.

The improved device comprises essentially a clamp which may be readily applied to a pipe, about the section in which the break occurs, without the employment of special tools or implements and which may be manufactured and sold at a very low price.

In the accompanying drawings:—

Figure 1 is a plan of a section of pipe having a device embodying the present invention applied thereto;

Figure 2 is a transverse section substantially on the line 2—2 of Figure 1;

Figure 3 is a view similar to Figure 1 showing a slightly modified construction;

Figure 4 is a transverse section on the line 4—4 of Figure 3;

Figure 5 is a plan of another modification;

Figure 6 is a section on the line 6—6 of Figure 5.

Referring to the drawings, it will be seen that in each of the several embodiments of the invention illustrated the improved device comprises two members each including a transversely curved section adapted to partly surround a pipe and terminating at one edge in a radially extending flange, the two members being interengaged at points substantially opposite the flanges by a detachable hinge-like connection and the two flanges being in close contact when the sections are assembled in operative position or placed about a pipe. Means are provided whereby the flanges are connected and the parts held in operative position.

In the embodiment of the invention illustrated in Figures 1 and 2 the transversely curved section 1 terminates at one edge in a radially extending flange 1ª and is provided adjacent its edge opposite said flange with a plurality of slots 2, through which extend tongues 3 at one edge of the curved portion 4 of the other member, the flange 4ª of which is held close against the flange 1ª by threaded bolts 5 and nuts 6.

In the form shown in Figures 1 and 2 the tongues 3 are of considerable length in the direction of the length of the pipe 7 and the slots 2 are, of course, formed of such length as to permit the ready insertion therein of said tongues.

In the embodiment of the invention illustrated in Figures 5 and 6 the tongues 8 are relatively narrow and extend from the section 9 through circular apertures 10 formed in one of the flanges of the clamp member 11. The latter in this embodiment of the invention is provided at each edge with a radially projecting flange 11ª, 11ᵇ, the latter being apertured to receive the tongues 8 as aforesaid and the former abutting a flange 9ª on the clamp member 9. Bolts 12 and nuts 13 are provided for maintaining the members of the clamp in operative relation.

Figures 3 and 4 illustrate a form of the invention which is adapted to be employed with pipes of different diameters. Referring to these figures, it will be seen that the clamp member 14 is provided with two series of apertures, 15, 16, with either of which the tongues 17 of the clamp member 18 may be engaged. As the tongues 17 are engaged with either set of apertures in the clamp member 14 it will be evident that there will result a lateral sliding movement between the radially projecting flanges 14ª, 18ª, and to permit of this I preferably form slots 20 in the flange 14ª through which the securing bolts 21 extend.

In using the device it is preferable to first place a strip of flexible material, for example rubber fabric 22, over the break in the pipe which is to be stopped and then apply the clamp so that such flexible strip will be held in close contact with the pipe 7. As shown in the several cross sectional views, the width of this flexible strip may be such as to cause it to practically encircle the pipe or may be considerably narrower, it merely being necessary that it have sufficient width to ensure that it will be held by the clamp in close contact with the pipe at both sides of the break as well as across the width thereof.

The members of the clamp may be formed of cast or sheet metal or other suitable material and it will be readily seen that the device may be applied to a broken pipe in a minimum amount of time and without requiring any particular skill or the use of special tools or implements. The two members of the clamp being normally separated, or readily detached one from the other, either may be slipped into position as regards a pipe situated relatively close to a wall and the other section then readily interlocked therewith which would not be possible if the hinge-like connection between the two clamping members was a permanent one. There can, of course, be considerable variation in the shape of the tongues and apertures by which the two sections are interlocked, and it is not intended, therefore, to limit the invention to the particular embodiments thereof illustrated.

The invention provides a very inexpensive and readily manipulated device which can be easily applied by unskilled persons and in localities where it would be difficult to obtain the services of a skilled workman without great inconvenience or expense.

Having thus described the invention what is claimed as new is:—

1. A device for the purpose described comprising two members adapted, when assembled, to surround a pipe and each including a transversely curved section having at one edge a radially projecting flange, said members having a hinge-like connection with each other at the opposite side of the curved sections from said flanges and the latter being in overlapping relation when the members are in operative position about a pipe, said hinge-like connection permitting relative adjustment of the members to accommodate the device to pipes of different diameter, and the flange of one of the members having formed therein a slot, and a securing bolt extending through said slot and the flange of the other member.

2. A device for the purpose described, comprising two members adapted, when assembled, to surround a pipe, each including a transversely curved section having at one edge a radially projecting flange, said flanges being in overlapping relation when the members are fitted to a pipe, one of the members being provided at the opposite side of its curved section from said flange with two series of spaced apertures and the other member having a plurality of tongues adapted to be engaged with either series of apertures in the aforesaid member, and securing bolts extending through the flanges of said members.

3. A device for the purpose described, comprising two members, each including a transversely curved section, adapted to partly surround a pipe, and a radially projecting flange, said members being provided with interlocking means providing a hinge-like connection between them at points substantially opposite said flanges and the latter being in overlapping relation when the members are connected and in operative position, the hinge-like connection between the members permitting adjustment of the members to fit pipes of different diameters, and means connecting the flanges.

In testimony whereof I have hereunto set my hand.

DAVID BERNARD CROCKETT.